(12) United States Patent
Daniel et al.

(10) Patent No.: US 7,907,337 B2
(45) Date of Patent: *Mar. 15, 2011

(54) DISPLAY DEVICE HAVING AN EXTENDIBLE SCREEN

(76) Inventors: Simon R. Daniel, London (GB); Christopher V. Wright, London (GB)

( * ) Notice: Subject to any disclaimer, the term of this patent is extended or adjusted under 35 U.S.C. 154(b) by 1031 days.

This patent is subject to a terminal disclaimer.

(21) Appl. No.: 11/622,922

(22) Filed: Jan. 12, 2007

(65) Prior Publication Data

US 2007/0177404 A1 Aug. 2, 2007

Related U.S. Application Data

(63) Continuation of application No. 10/873,561, filed on Jun. 22, 2004, now Pat. No. 7,180,665.

(60) Provisional application No. 60/480,843, filed on Jun. 23, 2003.

(51) Int. Cl.
*G03B 21/56* (2006.01)
*A47G 5/00* (2006.01)

(52) U.S. Cl. .......... 359/461; 359/443; 160/373; D16/241

(58) Field of Classification Search .................. 359/461, 359/443; 160/373, 374, 378, 24, 265, 370.22, 160/27, 28, 23.1; D16/241
See application file for complete search history.

(56) References Cited

U.S. PATENT DOCUMENTS

| | | | | | |
|---|---|---|---|---|---|
| 4,110,003 | A | * | 8/1978 | Zinn | 359/461 |
| 5,373,942 | A | * | 12/1994 | Weder | 206/423 |
| 6,249,377 | B1 | * | 6/2001 | Takamoto et al. | 359/461 |
| 7,180,665 | B2 | * | 2/2007 | Daniel et al. | 359/461 |
| 7,510,111 | B2 | * | 3/2009 | Mikkelsen et al. | 235/375 |

* cited by examiner

*Primary Examiner* — Georgia Y Epps
*Assistant Examiner* — Magda Cruz
(74) *Attorney, Agent, or Firm* — Conley Rose, P.C.

(57) ABSTRACT

A display device (1) has an extendible screen (2) and at least one extendible side member (3). The extendible screen (2) is extendible in an extension direction from a relatively compact form to an extended form. The screen (2) in the extended form has opposed edges (17) that are substantially parallel to the extension direction. An extendible side member (3) is provided for at least one of said opposed edges (17). The or each extendible side member (3) is extendible to provide support to and structural rigidity to the screen (2) when the screen (2) is in the extended form. The display device (1) provides an extendible rigid screen (2) suitable for example for creating a rigid collapsible tablet computer, or enabling a compact portable display to support a rigid touch-screen, or for incorporation into a mobile phone or remote control unit.

14 Claims, 12 Drawing Sheets

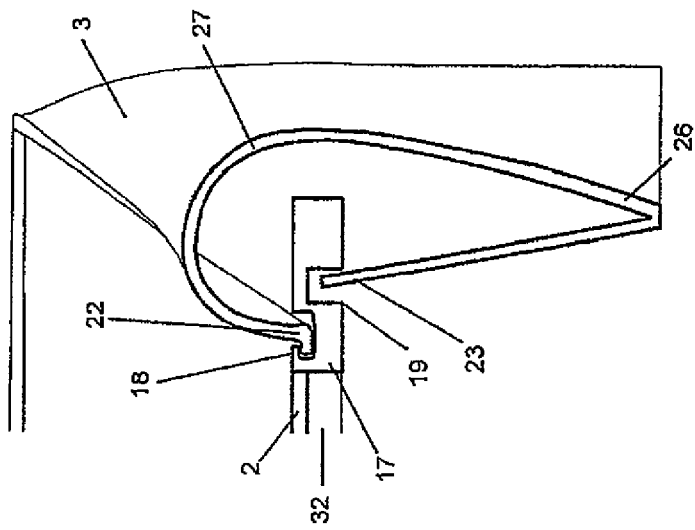
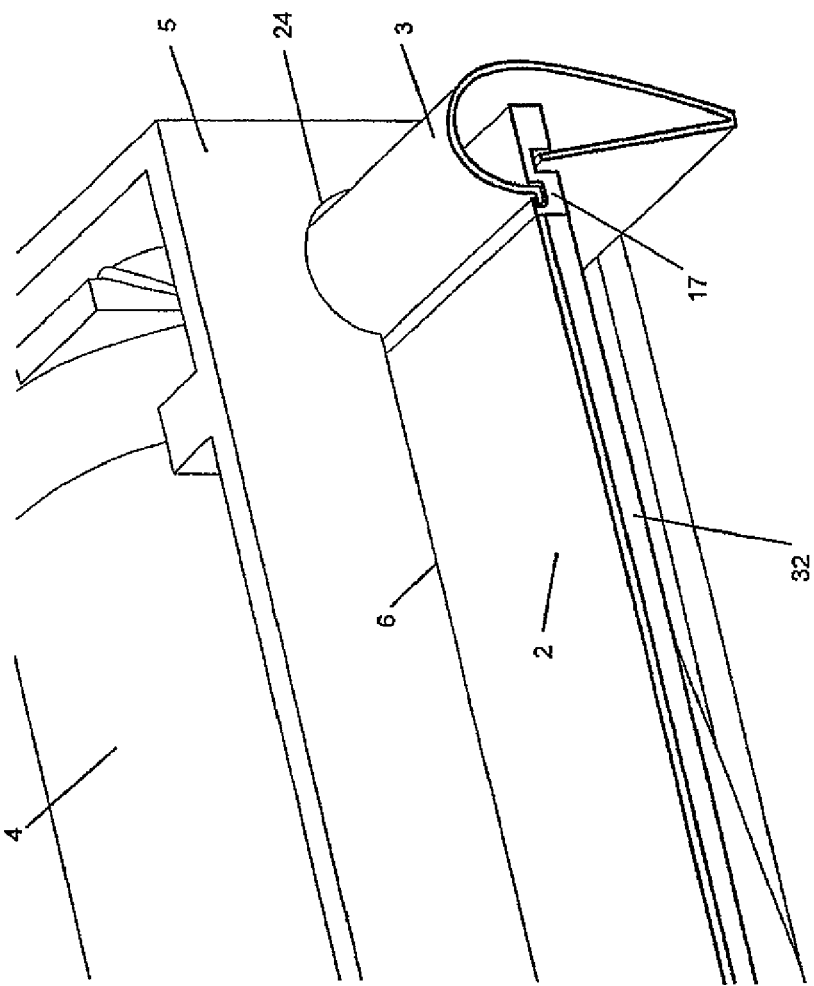

DISPLAY DEVICE HAVING AN EXTENDIBLE SCREEN

CROSS-REFERENCE TO RELATED APPLICATIONS

This application is a continuation application of U.S. patent application Ser. No. 10/873,561 filed Jun. 22, 2004, which claims priority to U.S. Provisional No. 60/480,843 filed Jun. 23, 2003, the disclosures of which are incorporated herein by reference.

The present invention relates to a display device having an extendible screen.

There is growing demand for extendible screens for displaying text and/or graphics for use with computers or other electronic and mobile devices. As computing power relative to size increases, it is possible to make electronic devices in ever smaller sizes to meet consumer demand. However, one of the limiting factors encountered with this miniaturization of technology is in the user interface. Specifically referring to the screen, as the screen is reduced in size the amount of information it can relay is also reduced until a point where it is impractical for the user to use.

In several prior art documents, for example U.S. Pat. No. 6,311,076, US-A-2001/0003450, JP-A-2000/132122 and JP-A-1999/272205, the conflicting demands of providing a small screen for portability and a large screen for useful display of information are addressed by providing flexible screens which can be arranged in more than one form. In each case, a flexible screen can be rolled into a compact form when not being used and unrolled into an extended form for the display of information. The screen is rolled about either one or two axes when in the compact form. The prior art arrangements however have a number of shortcomings, which the present invention addresses.

According to the present invention, there is provided a display device, the display device comprising: an extendible screen that is extendible in an extension direction from a relatively compact form to an extended form, the screen in the extended form having opposed edges that are substantially parallel to the extension direction; and, an extendible side member for at least one of said opposed edges, the or each extendible side member being extendible to provide support to and structural rigidity to the screen when the screen is in the extended form.

The present invention provides an extendible screen with at least one extendible side member in order to provide at least some structural rigidity to the screen when in the extended form. The display device is capable of being arranged in a compact form, for example for storage or transportation purposes. However it is also capable of being deployed with the screen in at least one extended form, with the or each side member also extending to provide support to the screen. The structural rigidity given to the extended screen allows it to be used in a wider range of applications than would otherwise be possible. For example, the screen is capable of being placed on an irregular surface whilst still retaining its flatness. This is in contrast to prior art devices with flexible screens but no support which would need to be held in position by external means or placed on a flat surface of sufficient size. In addition, the support given to the screen can allow the device to be held in one hand, leaving the other hand to provide input to the device for example. The screen is also more suitable to incorporate a touch-sensitive input device. The support and rigidity given to the screen by the or each side member allows the flexible screen to receive touch input without deforming under the pressure of the input. In addition the side member provides a solid edge which protects the potentially delicate edge of the screen. The side member also gives the display device a more solid, robust look and feel. Overall this provides the advantage of a solid tablet display with significantly increased portability and flexibility in terms of screen size and application.

In a preferred embodiment, the display device comprises a respective extendible side member for each of said opposed edges. This gives greater structural rigidity to the display device and more complete protection from damage to the potentially delicate edges of the screen. In one preferred arrangement, the screen can be tautly suspended between the two side members providing further support to the screen.

In a most preferred embodiment, the or at least one of the side members is provided by a bistable material having a first stable state when said side member is extended and a second stable state when said side member is not extended. Bistable materials per se are known and are capable of forming two stable structural forms (see U.S. Pat. Nos. 6,256,938 and 6,217,975 for example). In other words a bistable material can transform between a first stable form and a second stable form and are typically capable of bearing significant physical loads when in their stable forms. Hence they can be employed in the present invention to provide side members that have a first stable form in which the side members are in a compact form and a second stable form in which the side members are in an extended form, and are capable of bearing load. Furthermore, the preferred bistable material can exist with one end in one stable form and the other end in a second stable form, the bistable material therefore being capable of forming extendible side members that can be extended to any desired length.

In an embodiment, the screen is extendible to and lockable at an intermediate position between said relatively compact form and said extended form, the or each side member being extendible to provide support to and structural rigidity to the screen when the screen is in the intermediate position. The screen can thus be extended to the desired size according to the application and locked into position. A screen of the desired size can thus be formed, such sizes including for example a large "tablet" computer mode, a "widescreen" for play back of movies, an A4 size screen for displaying documents or web pages, and a smaller A5 size screen for use with a PDA device. The side members also provide a uniform appearance of the device at each size.

In a preferred embodiment, the display device comprises a bar extending between said opposed edges, the bar being fixed to the screen and the or each side member. Such a bar can be used to aid in the extension and/or retraction of the screen. The bar can be fixed to the screen and the or each side member to set their relative position and to ensure that their correct alignment is maintained. In addition, the bar can be used to mark the midpoint, or any other convenient point, of the screen to provide a reference point, and used to fix the or each side member in its load-bearing form at its midpoint. This can be achieved in a simple way in a preferred embodiment by providing the bar with an end profile shaped to lock the side member in its load bearing form. Also, in the embodiment where the screen is rolled about two axes, the bar can be used to define a boundary defining which part of the screen is rolled about which axis. The bar can also be used as part of a mechanism to implement this.

The display device may comprise a locking mechanism for locking the or at least one of the side members in its extended form.

In a preferred embodiment, the display device comprises at least one housing which at least partially accommodates the screen when in said relatively compact form, wherein the or at least one of the side members is at least partially accommodated by the housing when the screen is in said relatively compact form. The housing preferably has a guide aperture through which said side member passes on extension or retraction of the screen in order to guide the movement of said side member between the extended and retracted states of said side member. This is particularly useful in the case of the side member being formed from a bistable material because the guide apertures can be shaped to aid the transition between the two stable states of the side member as it passes through the aperture.

In another preferred embodiment, at least one of said opposed edges of the screen has a groove which receives a tongue of the corresponding side member when the screen is in the extended form. In a further preferred embodiment, the tongue is provided by an edge of the side member. This tongue and groove arrangement between the side member and the screen edge helps to lock the screen to the side member and maintain the side member in an open stable state, and can be arranged to allow force to be transmitted between the side member and the screen. Hence when both sides of the screen are locked to side members in this way, the flexible screen can be tautly suspended between the two rigid side members, thus providing further rigidity to the screen. This locking can exist along the length of the extended screen edges, thus allowing an even distribution of force across side members. Such an arrangement can be dynamically formed, meaning that, in an embodiment where a guide aperture is provided, each part of the tongue and groove engage with each other as and when they are extended through the guide aperture. Accordingly when the screen and side member(s) are not extended, they can be stored separately from each other. This allows the two to be stored in different fashions, allowing flexibility in the storage arrangements (and manufacture) of the screen and side member(s) and therefore permitting the compact form of the device to be small.

In a most preferred embodiment at least one of said opposed edges of the screen has plural projections which are received by respective plural apertures or recesses on the corresponding side member when the screen is in extended form to provide a reversible locking arrangement between said screen edge and said side member. The apertures/recesses and projections provide a further or alternative locking arrangement between the extended portions of the screen edge and the corresponding side member to that of the tongue and groove arrangement of the previously described embodiment. The locking arrangement of the apertures/recesses and projections may provide the same advantages as the tongue and groove arrangement. In addition the locking arrangement of the apertures/recesses and projections restricts relative movement between the side member and corresponding screen edge in a longitudinal direction.

In a most preferred embodiment, the display device comprises at least one guide member for at least one side member, the or each guide member being arranged to guide the side member and screen edge into or out of locking engagement on extension or retraction respectively of said side member and screen. In this instance, upon retraction of the screen and side member, the guide member guides the side member so that the apertures/recesses of the side member disengage from the projections of the screen edge. After disengagement, the guide member may provide the further advantage of guiding the side member and screen edge such that each is guided into a respective storage region inside the housing.

In a most preferred embodiment, the side member has a first cross-sectional shape when in its extended form and a second cross-sectional shape when in its retracted form, the housing has a guide aperture through which said side member passes on extension or retraction of the screen, and said side member has a tongue provided by an edge of said side member and the corresponding edge of said screen has a corresponding groove, wherein said guide aperture is arranged to guide the transition of said side member between its first and second shapes on retraction and extension of the side member respectively and to cause said tongue to engage with said groove on extension of the side member. The guide aperture of this embodiment has the dual function of aiding the transition of the side member between its retracted form and its extended form as the screen is extended and retracted, and aiding the formation of the tongue and groove engagement between the side member and the screen as the side member and screen are extended.

In an embodiment, the screen comprises a screen backing layer formed from a plurality of substantially parallel slats arranged perpendicularly to the extension direction.

In an embodiment, the screen comprises a screen backing layer formed from a bistable material that has increased rigidity when planar. In another embodiment, the screen comprises a screen backing layer formed from a smart material that has increased rigidity when planar and is capable of undergoing a current-assisted solid-state phase transition. These arrangements of the screen backing layer provide the screen with increased rigidity when the screen is in its extended form, and decreased rigidity, which provides the advantage of aiding the screen to assume and maintain a compact form.

In a further preferred embodiment, the screen is arranged to roll from the extended form to the relatively compact form. In one embodiment, the rolling screen rolls about a single axis. However, in a preferred embodiment, the rolling screen rolls partly about a first axis and partly about a second parallel axis.

The display device in a preferred embodiment is capable of providing an extendible rigid screen suitable for creating a rigid collapsible tablet computer, or enabling a compact portable display to support a rigid touch-screen, or for incorporation into a mobile phone or remote control unit.

Embodiments of the present invention will now be described by way of example with reference to the accompanying drawings, in which:

FIG. 5 shows a partially sectioned enlarged detail of FIG. 3 shown in perspective;

FIG. 6 shows a cross-section of one of the side members of the first example interlocking with a side of the screen;

Figure 1:
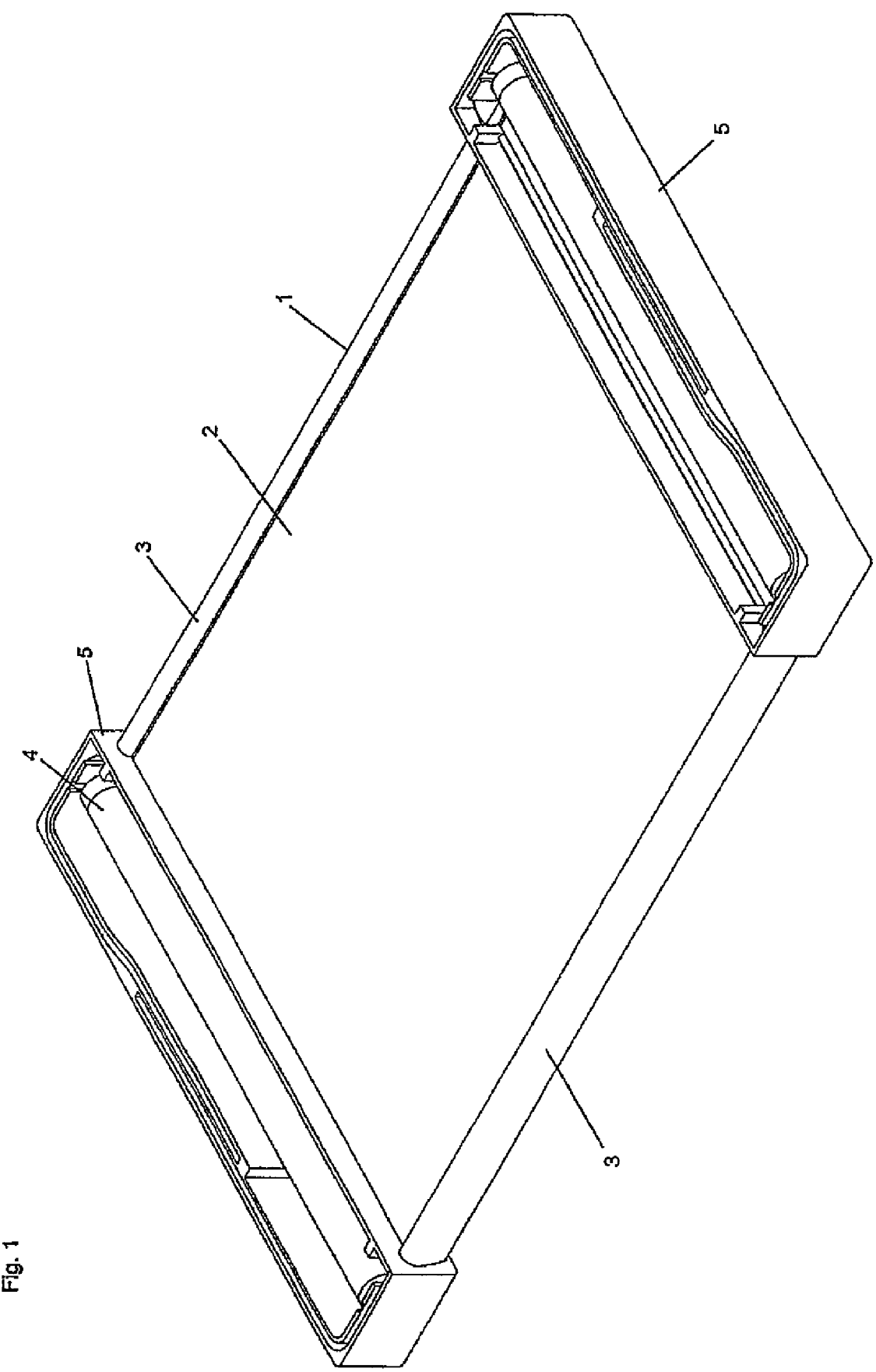
FIG. 1 shows a perspective view of a first example of a display device constructed in accordance with an embodiment of the invention.

Referring to the drawings, a display device 1 comprises a rollable screen 2 with two opposed side members 3. The rollable screen 2 is rolled at each ends about one of two opposed parallel rollers 4. Each roller 4 is mounted in a housing 5 and is free to rotate about its axis. An aperture 6 in the face of the housing 5 allows the screen 2 to pass into and out of the housings 5. The arrangement of the housings 5 and rollers 4 at each end of the screen 2 is identical in construction and operation and so only one wilt be described in detail in the following. This symmetric construction is an advantage of the preferred embodiment as it helps to keep down manufacturing costs.

Figure 4:
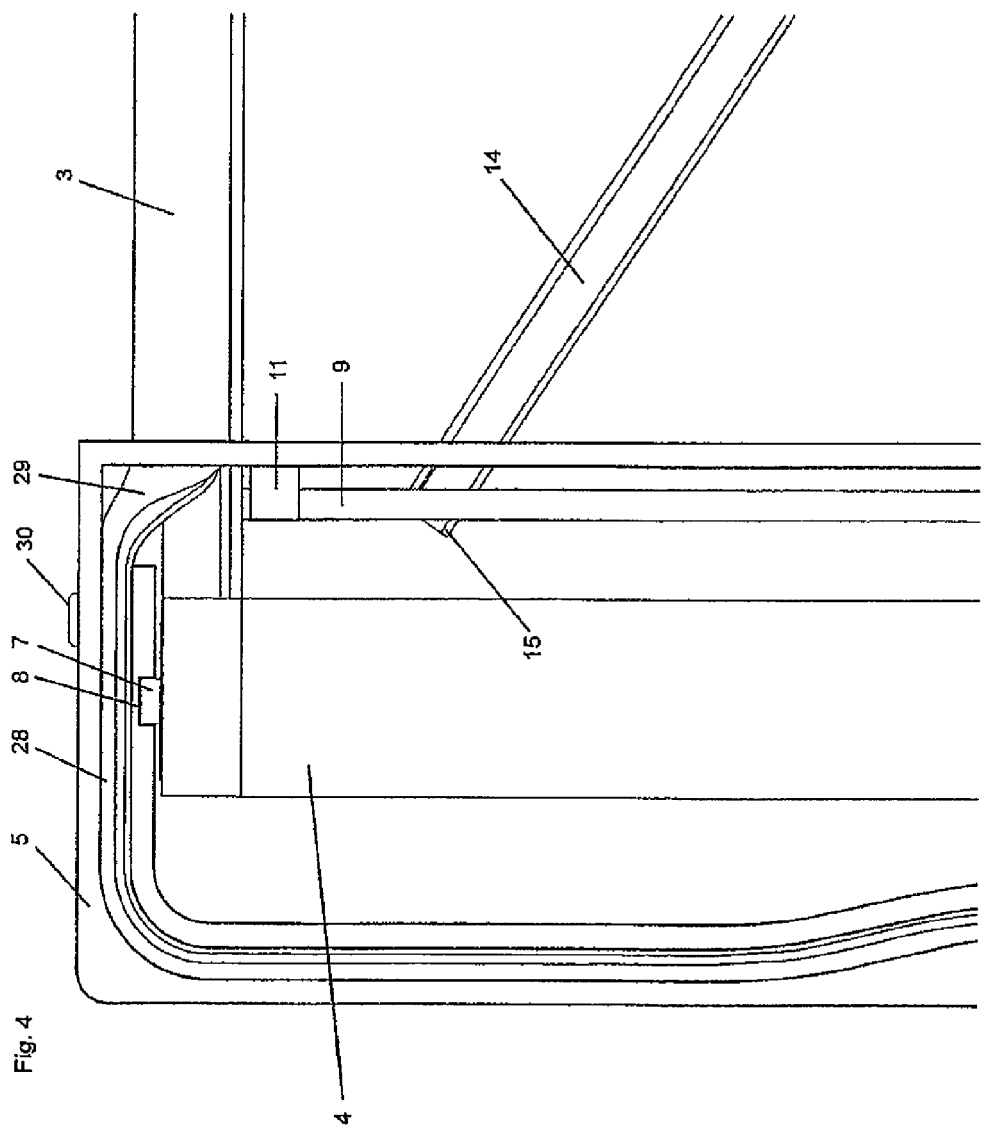
FIG. 4 shows an enlarged detail of FIG. 3 shown from above.

Referring to FIG. 4, a detailed view of part of the housing 5 is shown. At each end of the roller 4 there is a pin 7 which is co-aligned with the axis of the roller 4. Each pin 7 is received by a complementary recess 8 formed in the housing 5 which holds the roller 4 in position whilst allowing it to rotate about its longitudinal axis. A pair of roll bar guides 9 are positioned adjacent to the housing aperture 6, being positioned parallel to the roller 4, with one roll bar guide 9 above the other to form a roll bar aperture between them which is narrower than the housing aperture 6. This roll bar aperture acts as a guide for the screen 2 as it moves back and forth through the housing aperture 6. The roll bar guides 9 are retained at their ends by brackets 11 formed in the interior of the housing 5. The brackets 11 hold the roll bar guides 9 in position whilst allowing them to rotate about their axes. Hence, as well as guiding the screen 2, the smooth and rotatable nature of the roll bar guides 9 reduce frictional wear and other stresses on the screen 2 as it passes through the housing 5.

Figure 3:
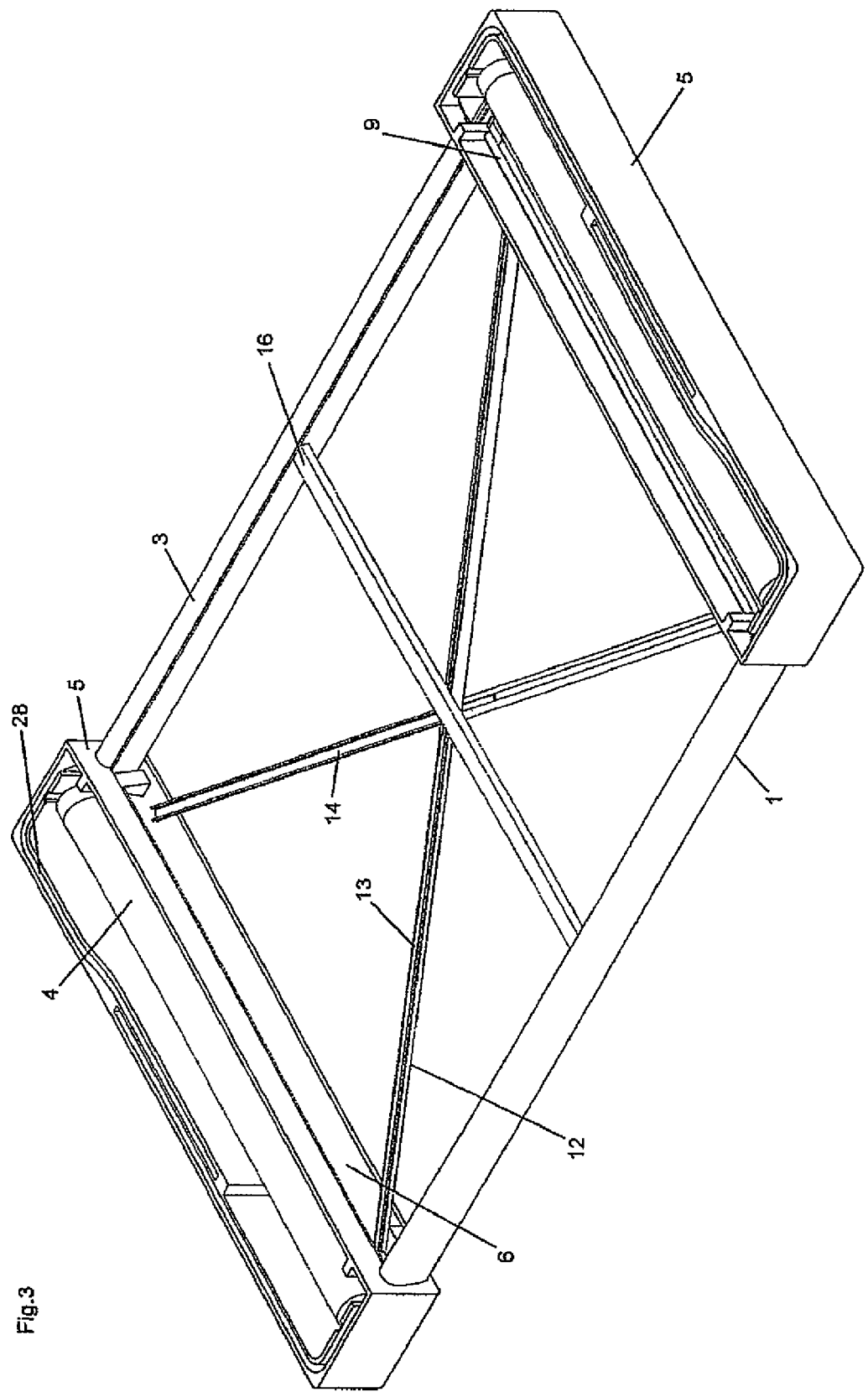
FIG. 3 shows a perspective view of the display device of FIG. 1 in an extended form with the screen removed for clarity.

Referring to FIG. 3, a similar view to FIG. 1 but with the screen removed for reason of clarity, an X-frame 12 is shown attached to the two opposed housings 5. The X-frame 12 is positioned immediately under the screen 2. In the embodiment shown the X frame 12 is comprised of two telescopically extendible members 13, 14, which are pivoted together at their midpoints. Each end 15 of each X-frame member 13, 14 passes into the housing 5 through the housing aperture 6 and is attached to an interior surface of the respective housing 5 in such a way that allows it to pivot. The X-frame 12 provides further structural rigidity to the display device 1. The X-frame 12 can also be used to limit the maximum extension of the screen 2.

One continuous, extendible side member 3 is disposed at each side of the screen 2. Each end of each side member 3 is accommodated by a respective housing 5 which it enters through a guide aperture 24. As the screen 2 extends or retracts from the housing 5, the side members 3 also extend or retract from the housing 5 to provide a continuous, structurally rigid edge to the screen 2. This arrangement provides several advantages.

First, it provides added structural rigidity to the device 1 as a whole and to the screen 2 in particular. This gives several beneficial capabilities to the device 1 when being used in its deployed mode. For example, the device 1 can be held in one hand, or in both hands, or placed on an uneven surface, whilst maintaining its form. Secondly, it provides support and stiffness to the screen 2, allowing it to maintain its flatness. As well as providing the advantages of a flat display surface, this can also prevent damage to the screen 2 where it is made of a technology susceptible to damage from sharp bending of its surface. Thirdly, the solid edge provides protection for the edge of the screen 2 from damage from external sources, as well as giving the device 1 a solid, rigid look, which is substantially uniform regardless of the extended length of the screen 2.

Similarly, an extendible backing layer 32 can also be provided. This can be positioned beneath the screen 2, extending between the side members 3, and in combination with the side members 3 would encase the parts of the screen 2 other than the display surface itself. This would allow circuitry or other components positioned under the screen to be hidden from view and protected from damage. This would also provide a more aesthetically pleasing, solid appearance to the device 1, which makes the device 1 more appealing to consumers, and can increase further the rigidity of the screen 2.

The backing layer 32 may be in the form of plural parallel slats which each extend across the width of the screen 2 and have increased rigidity by locking into the side member using, for example, a tongue and groove arrangement. (Such slats 35 are shown in the second example discussed below.)

Alternatively or additionally, the backing layer 32 can be formed, in whole or in part, from a bistable or smart material (such as a shape memory alloy) that has some increased rigidity in the flat deployed configuration. Such a smart material can utilise a pseudo-elastic effect (which can be enhanced, for example, by passing a current through the layer) to increase flexibility or undergo a solid-state phase change as the screen 2 rolls about the rollers 4.

Figure 7:
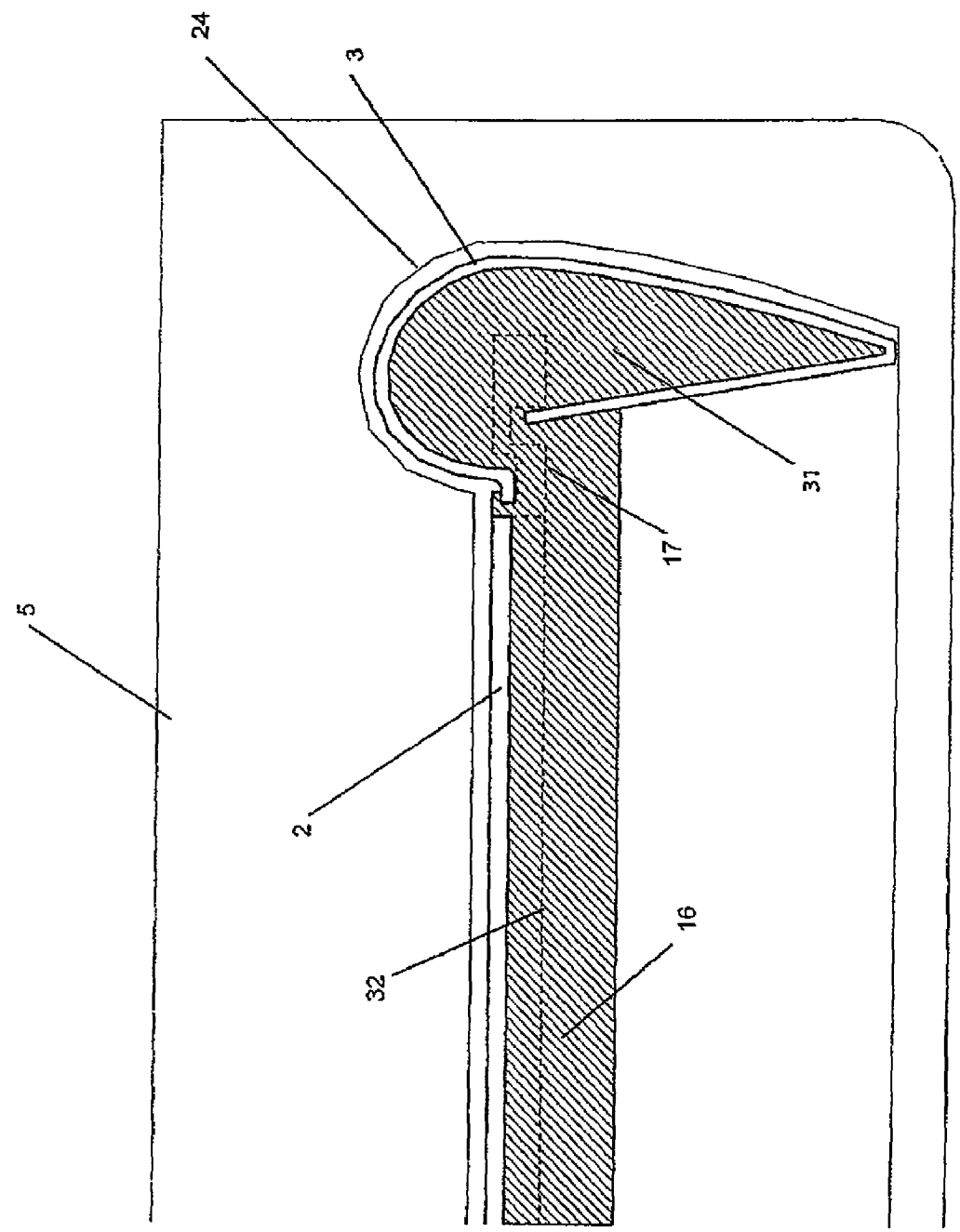
FIG. 7 shows a partial cross-section of the display device of FIG. 1 taken through the cross-bar.

A cross-bar 16 is attached to the underside of the screen and runs across its width parallel to the rollers 4. The two ends of the bar 16 are attached to the two side members 3 respectively. As shown more clearly in FIG. 7, an end profile 31, which in the preferred embodiment has a shape corresponding to the cross-sectional shape of the side member 3 in its open extended form, is formed at each end of the cross-bar 16 to lock the side members 3 in their load bearing form. In the preferred embodiment the cross-bar 16 is positioned at the midpoint of the screen 2 and the midpoint of the two side members 3. The cross-bar 16 serves a number of purposes. First, it acts as an additional support for the screen 2. Secondly, it provides a permanent connection between the screen 2 and the side members 3 at their midpoints which has the effect of maintaining their correct relative alignment and holds the midpoints of the side members 3 in their load-bearing bistable form at all extensions between fully compact and fully extended. Thirdly, it acts as a reference marking the midpoint of the screen 2 which can be used when retracting the screen or extending it to the desired position. Optionally the cross-bar 16 and the X-frame 12 can be attached to each other at their midpoints to further aid this process.

In the preferred embodiment the side members 3 are formed from a bistable material, such as are known per se. Bistable materials have the property of being able to take on two stable structural forms. Hence a member made using a bistable material is capable of forming two stable structures. Furthermore such a member can have one of its ends in a first stable state, and the other end in a second stable state, without significant instability. Bistable materials are also capable of forming members capable of bearing considerable loads. They are therefore well suited to the side members 3, as in a first stable state they can form an extended member capable of bearing load and providing support to the screen, and in a second stable state they can take on a more compact form which is stable.

Referring now to FIGS. 5 and 6, a cross section of a bistable side member 3 and part of the rest of the device 1 is shown. In its extended form, each side member 3 has a cross-sectioned shape that is approximately an inverted tear-drop, though with one edge 22 slightly more inboard that the other edge 23.

In the preferred embodiment the side members 3 lock to the edges of the screen 2 as the screen 2 is extended. A screen edge strip 17 is attached to each side of the screen 2 and runs along the extent of its length. Each screen edge strip 17 has an upper groove 18 and a lower groove 19 running along its length. When the screen 2 is extended, the edges 22, 23 of the side members 3 locate into the lower groove 18 and upper groove 19 respectively of the respective screen edge strips 17. The combination of the screen edge strip 17 with the bistable side members 3 "locked" into it provides a structurally rigid tubular member capable of bearing considerable load. This provides structural rigidity to the display device 1 as a whole, as well as supporting the screen 2 and constraining its edges, providing resistance to deformation of the screen.

In the compact form, each side member 3 is almost entirely in a relatively flat form. When in this form, the two legs of the lower V-shaped section 26 close together, whilst the upper curved section 27 flattens out so the section as a whole is substantially planar. Referring to FIG. 4, the end of the side member 3 which is accommodated within the housing 5 takes on this relatively flat form and is accommodated by channels 28 in the rear wall of the housing 5.

In order to aid the transition of each side member 3 between its two stable forms as it passes between the interior and exterior of the housing 5, the channel 28 stops short of the guide aperture 24 and the guide aperture 24 is shaped according to the two forms of the bistable material. Preferably, the guide aperture 24 has a shape intermediate the cross-sectioned shape of the side member 3 at its two stable forms. In other words, the guide aperture 24 is shaped to correspond to the shape of the side member 3 at its transition between the two stable forms. In a further embodiment, sprung bearings and/or roll-bars (not shown) can be positioned adjacent to the channel 28 and guide aperture 24 and arranged to aid the transition. (An example of this arrangement is shown in the second example discussed below.)

Accordingly, as each side member 3 is extended out of the housing 5, it passes through a transition 29 at which the two legs of the lower V-section 26 spring apart and its edge 23 is guided into position to lock into groove 19 of the screen edge strip 17, whilst the upper curved section 27 curls over to allow its edge 22 to lock into the upper groove 18 of the screen edge strip 17. This provides a "zip-fastening" effect between each side member 3 and screen edge strip 17, the side members 3 and edge strip 17 "locking" together as the side members 3 extend through their respective guide apertures 24.

In an additional embodiment, in place of a bistable material, the side members 3 can be formed from a material having a single intrinsic stable form, with a second stable form being achieved by the use of a magnetic strip. For example, the V-section 26 of side member 3 can have a first stable form where its two legs spring apart, and a second stable form where its two legs are held together by the action of a magnet on one of the legs and exerting a magnetic attraction to a magnetic element on the other leg. The guide apertures 24 again aid the transition between the two stable forms.

It will be appreciated that the display device 1 is in principal capable of being deployed in any intermediate configuration between the fully retracted, compact form and its fully extended form if desired.

Figure 2:
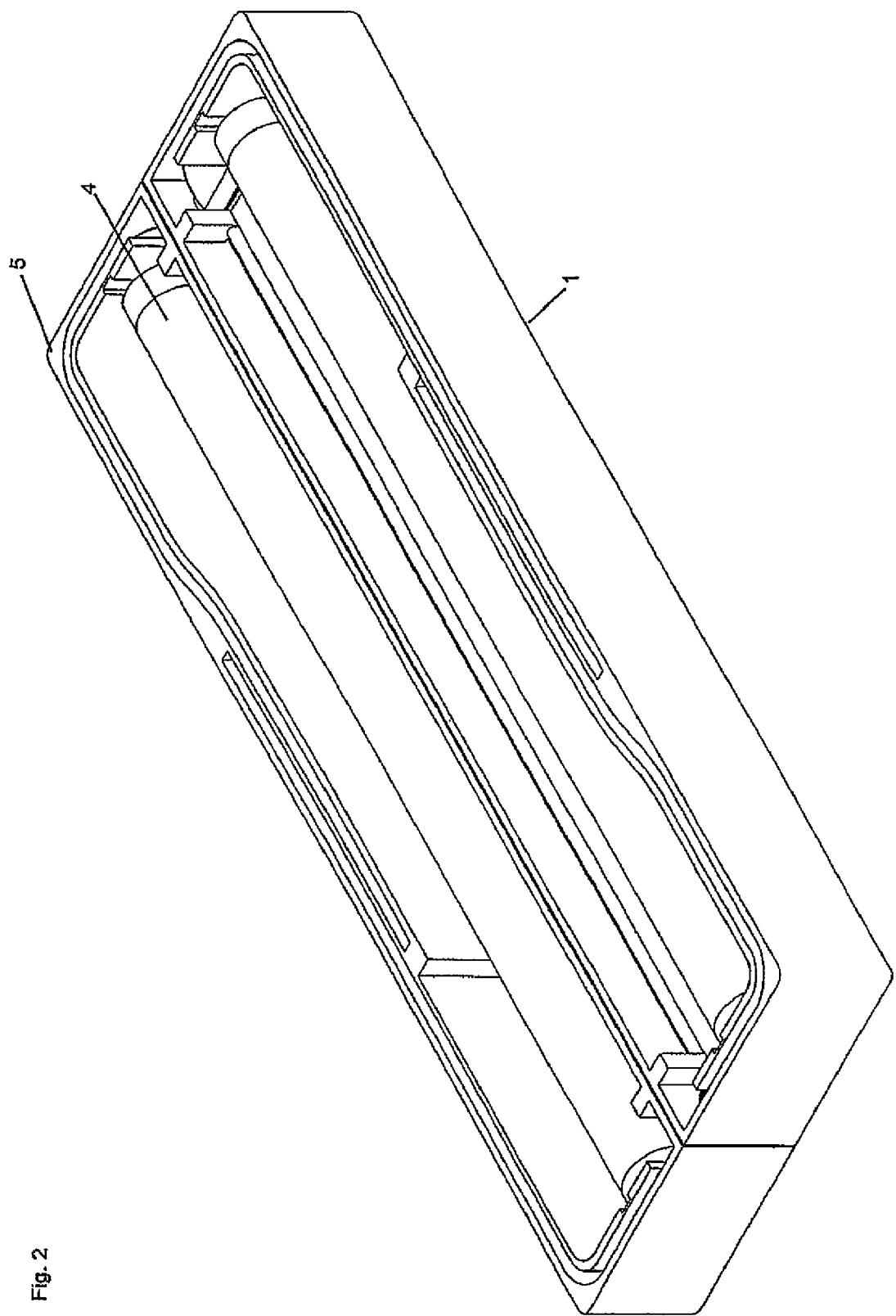
FIG. 2 shows a perspective view of the display device of FIG. 1 in compact form.

Referring to FIG. 2, the display device 1 is shown in its most compact form. The screen 2 is fully retracted and the housings 5 have come together to abut each other. The housings 5 can be locked together in this state with a latch (not shown) to prevent the device 1 from extending unintentionally. The screen 2 is rolled about the two rollers 4, the cross-bar 16 is accommodated equally in two recesses in the housings 5, the X-frame 12 has telescopically retracted, and the side members 3 have largely retracted into the housing 5, having assumed their relatively flat form, and are accommodated in the channels 28.

There are various options for deploying the device 1. For example, the housings 5 could be manually separated until the screen 2 achieved the desired width. Alternatively or additionally, one or both rollers 4 could be motor driven to allow the device to automatically produce a screen 2 of the desired width/length. The rollers 4 could be spring loaded to bias the device 1 to a pre-selected configuration. A brake (not shown), such as a friction pad bearing on one or both side member 3 can be incorporated into one or both of the housings 5 to allow the screen 2 to be locked into position in either a closed or partially or fully deployed configuration. This brake may be manually or electrically operated for example.

It is possible for the display device 1 to be deployed in more than one configuration, allowing screens 2 of different sizes and aspect ratios to be formed appropriate to the application for which the device 1 is being used. It is possible to completely automate the deployment of the screen 2. Controls 30 on the housing 5 may be used by the user to select an application that the device is to be utilised for (for example PDA or tablet mode). The device 1 could then automatically extend the screen 2 to the appropriate size and then lock it in place. The degree of screen extension could be determined for example by measuring the amount of rotation of the rollers 4 using electronic or optical means, such measuring techniques being known per se.

The screen 2 itself can be made from an organic LED (OLED) or polymer liquid crystal technology. The screen 2 can be combined with other technologies such as a flexible circuit control membrane to drive the display, and/or a flexible ion-polymer battery for power supply, and/or electroluminescent cable to back-light the display. Alternatively circuitry, batteries or other components can be stored inside the rollers 4, or elsewhere in the housing 5.

In addition, the screen 2 can be used for input as well as display. A touch-sensitive screen 2 can be implemented by adding charge grid technology to the screen 2. Sufficient support is given to the screen 2 to provide a substantively solid surface, permitting touch-sensitive operation. The X-frame 12, cross-bar 16 and particularly the side members 3 all provide support to the screen 2, whilst the "zip fastening" interface between the side members 3 and the screen edge strips 17 constrain the screen edges to provide a stiffening effect, further adding to its ability to resist deformation of its surface. In addition, ribs or slats (not shown) can be embedded in the screen backing 32 running parallel to the rollers 4. These would provide added stiffness to the screen 2 in this direction, whilst not affecting the screen's ability to roll about the rollers 4. Such ribs may have a cross sectional shape that is square or rectangular or some other shape, such as a sector of a circle.

The display device 1 can also be used with a simpler screen 2, such as a static solid state screen combined with a magnetic print head/refresh bar in the housing 5 which resets the image each time the device 1 is opened. This would allow applications such as digital newspapers, key documents or web site display.

The display device 1 can be combined with other technology to provide other applications. CPU and other processing means could be encased by the housing 5. Communication devices can be encased in the housing 5 to allow the device 1 to access and display web pages, for example. USB connectivity can be added to allow interfacing to other external devices. Input devices can be associated with the housing 5. For example, pointing devices such as a tracker ball or mouse "nubbin" and/or hot keys can be provided in one of the housings 5 at an ergonomically suitable position.

Referring now to FIGS. 8 to 14, a second example of an embodiment of the present invention is shown. Like reference numerals are used for corresponding features in the first example (shown in FIGS. 1 to 7) and the second example. The second example differs from the first example only in certain features and accordingly not all features of the second example will be discussed in detail here. Generally speaking the second example differs from the first embodiment in that the housings 5 are more stylised, the channels 28 are positioned in front of the rollers 4 rather than in the rear wall of the housings 5, and there is a different locking arrangement concerning the side members 3 and the screen edge strips 17, which allow among other things a reduced cross-section profile of the side members 3.

Figure 8:
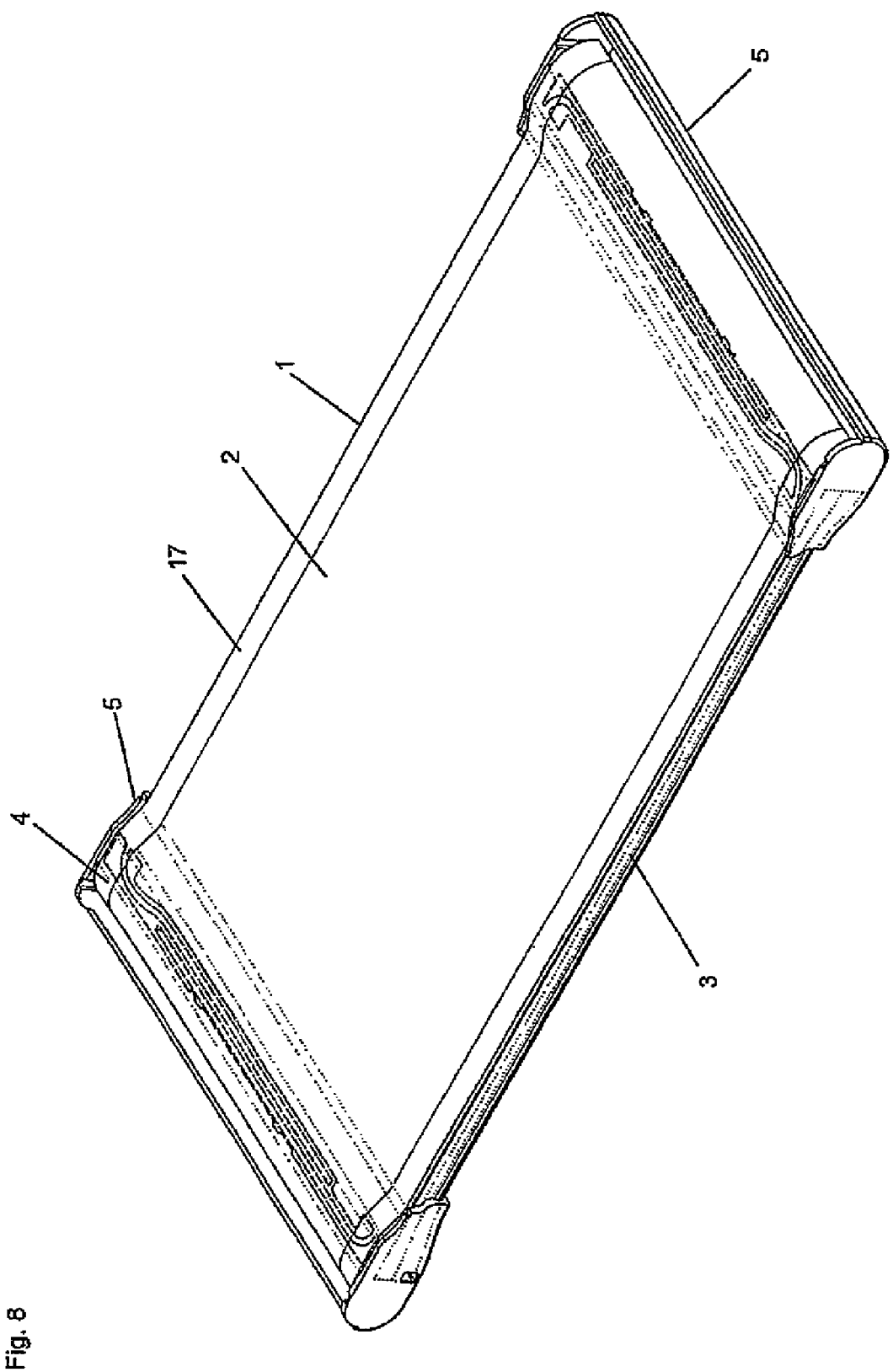
FIG. 8 shows a perspective view of a second example of a display device constructed in accordance with an embodiment of the invention.
Figure 9:
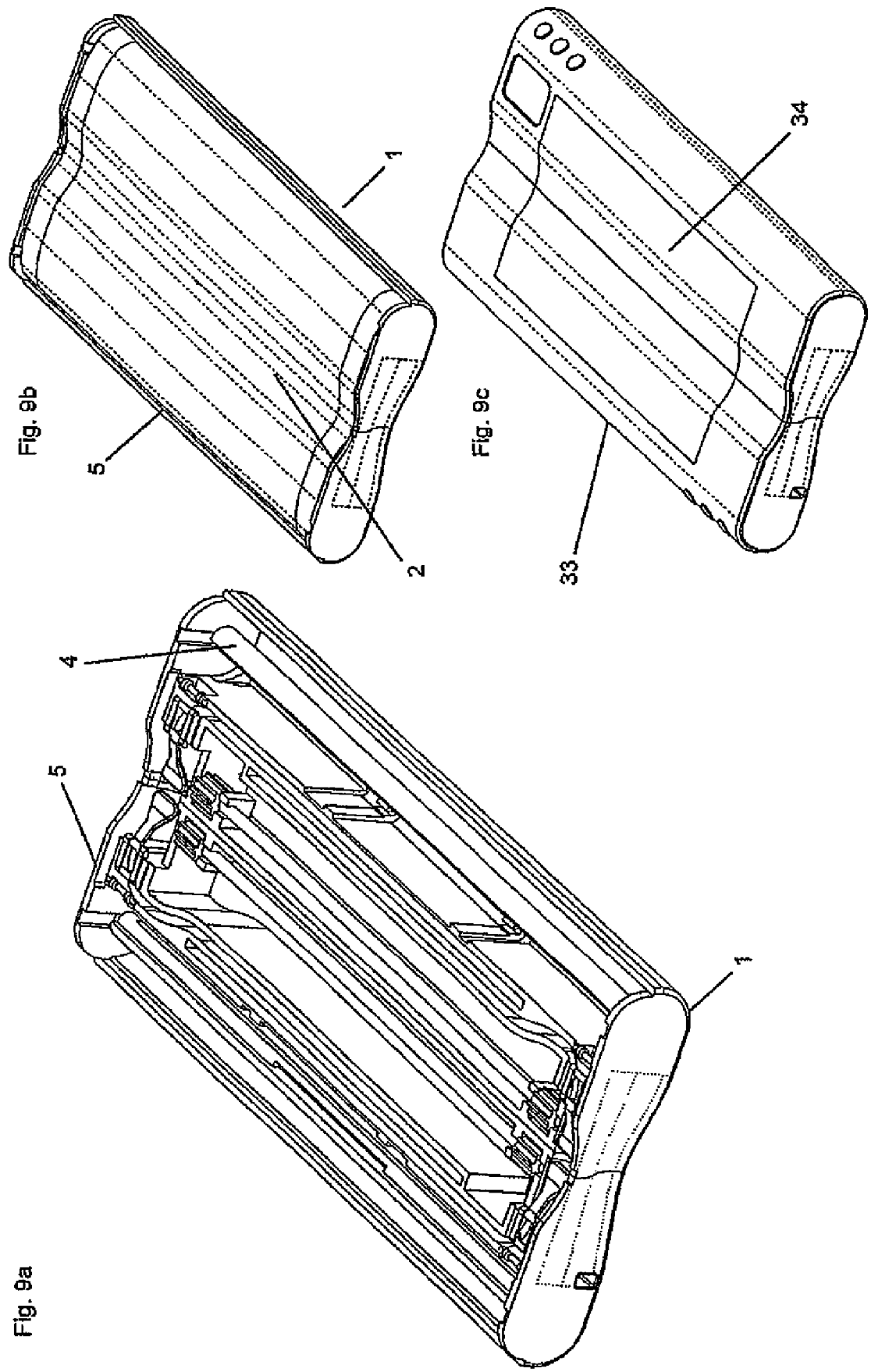
FIGS. 9a, 9b and 9c show a perspective view of the display device of FIG. 8 in compact form.

FIG. 8 shows the display device 1 in a deployed configuration with the lid 33 of each housing 5 removed for clarity. The housings 5 support the rollers 4 which are attached to the screen 2 and side members 3 which are attached to the screen edge strips 17. The screen edge strips 17 in this example form the top face of the side structure rather than the interior.

FIG. 9a shows the display device 1 in its collapsed configuration. FIG. 9b shows the profile of the screen 2 when fully stored and rolled around the rollers 4. FIG. 9c shows the device with the lids 33 attached to the housings. The lids 33 preferably provide a viewing window 34 to allow the screen to be partially visible in the collapsed configuration.

Figure 10:
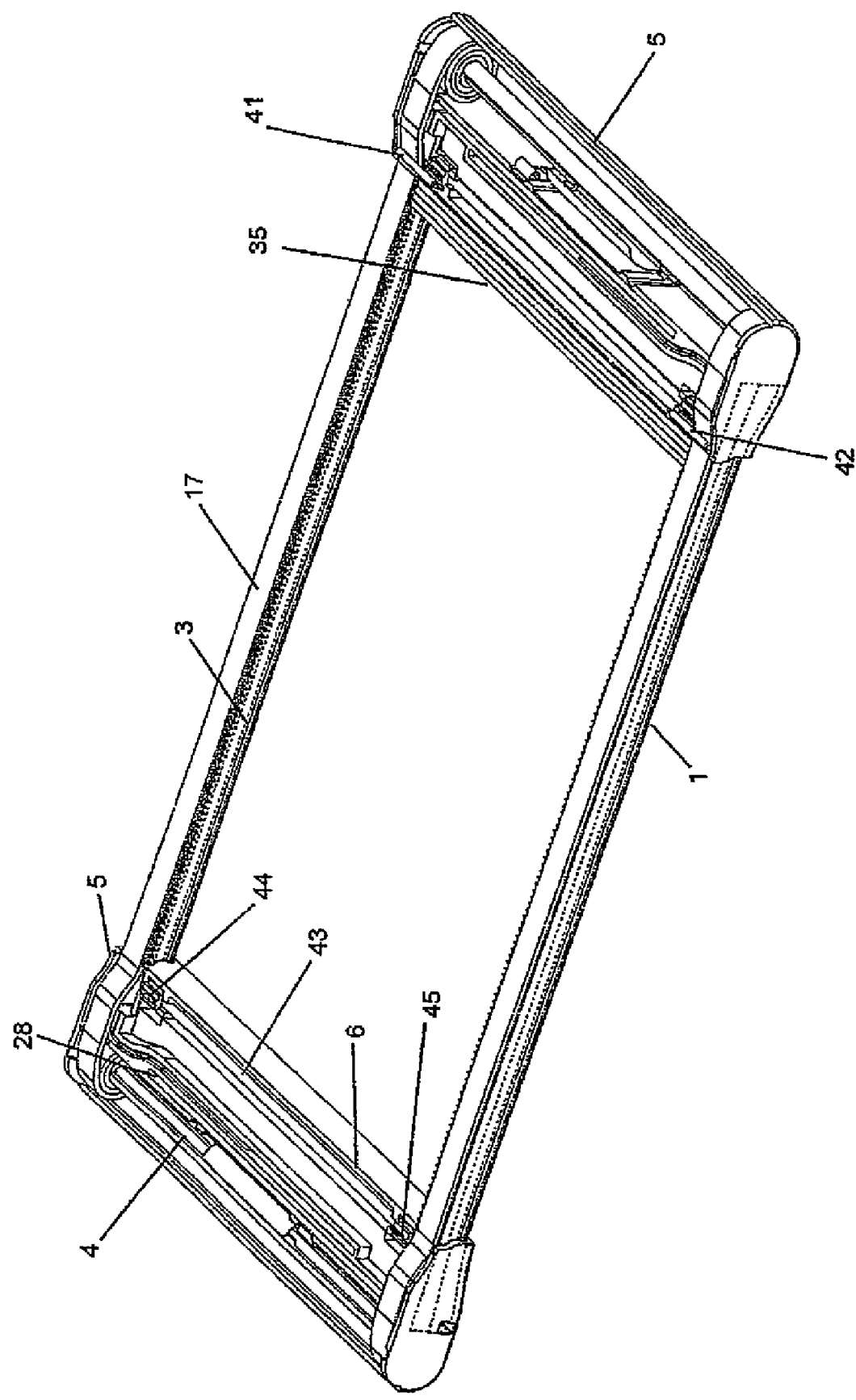
FIG. 10 shows a perspective view of the display device of FIG. 8 in an extended form with the screen removed for clarity.

FIG. 10 shows the display device 1 with the screen 2 and housing lids 33 not shown for clarity. The X-frame 12 is omitted in this example as the required structural rigidity is provided to the display unit 1 in particular by the combination of the housings 5, the side members 3, the screen edge strips 17, and the screen backing slats 35.

For each housing 5, the aperture 6 is formed as a gap between the housing 5 and the lid 33 when in place. The roll bar guide 9 comprises two upper short roll bars 41, 42 and a lower cogwheel roll bar 43 (shown only in FIG. 10 for one housing 5 for clarity). The two upper short roll bars 41, 42 are mounted at both sides of the aperture 6 adjacent to its top. The lower cogwheel roll bar 43 extends across the width of the aperture 6 adjacent to its bottom, and comprises of two cogwheels 44, 45 mounted on a roll bar. Each roll-bar 41, 42, 43 is mounted in the housing 5 such that it can rotate about its longitudinal axis. The roll bars 41, 42, 43 are arranged so that the screen 5 passes between the upper roll bars 41, 42 and the lower roll bar 43 when passing through the aperture 6.

The screen 5 has support slats 35 formed on its under side 32. The slats 35 have a cross sectional shape in the form of a (partial) sector of a circle. This cross sectional shape allows the slats 35 to engage with the recesses formed between the teeth of the two cogs 44, 45 of the lower cogwheel roll bar 43. As each slat 35 engages with the cogwheel roll bar 43 it is constrained in its alignment to be parallel to the cogwheel roll bar 43 and thereby perpendicular to the direction in which the screen 2 is being extended or retracted. This arrangement helps maintain the screen in a rectangular/square form.

Referring now to FIGS. 11 to 14, detail sections of the display device 1 are shown, showing a part of one housing 5, side member 3, screen edge strip 17, etc. Accordingly, in the following discussion in relation to FIGS. 11 to 14, a single instance of these features is generally described. It should be noted, however, that the description applies equally to all instances of the particular feature.

Figure 11:
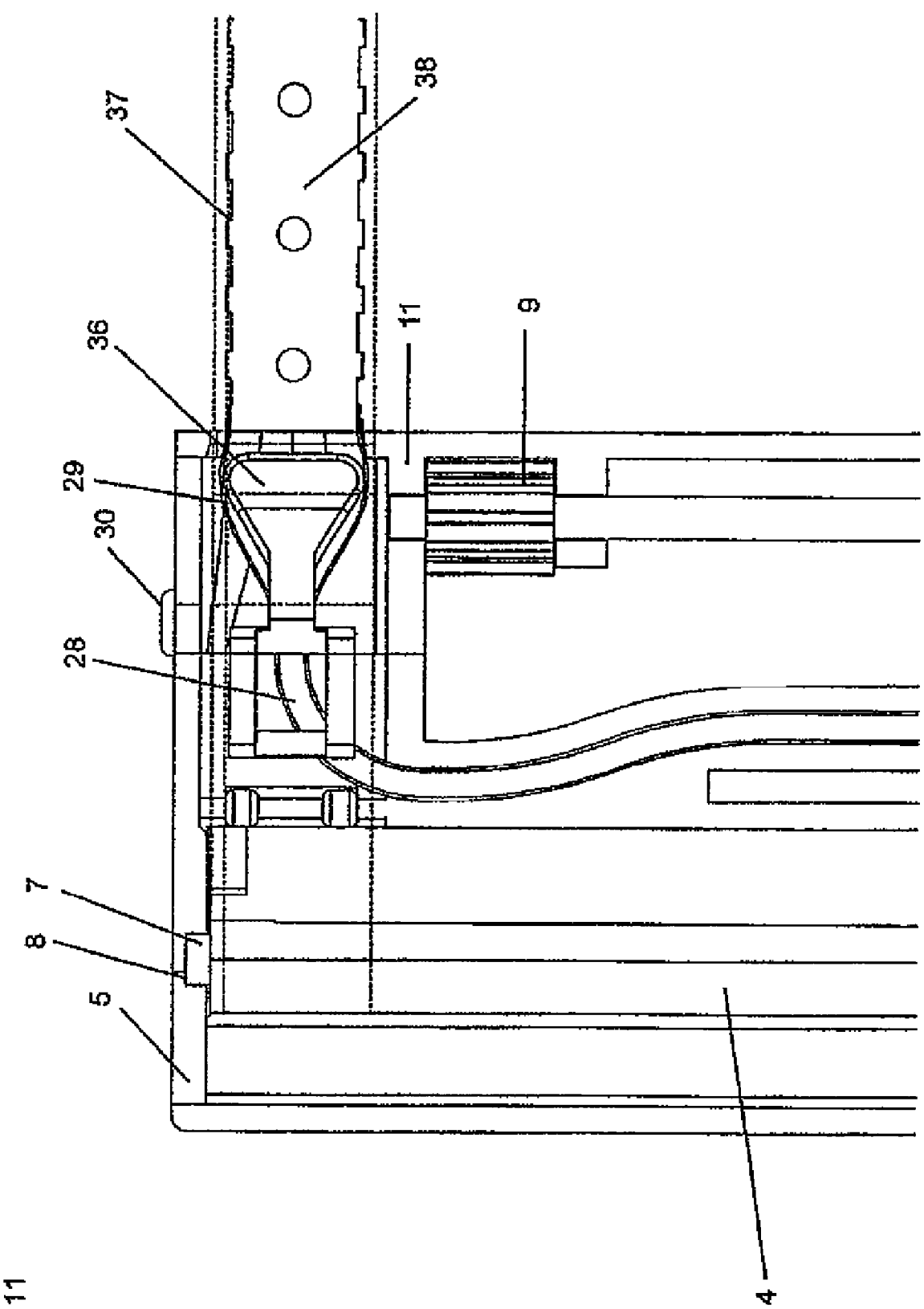
FIG. 11 shows an enlarged detail of FIG. 10 shown from above.

Referring now to FIG. 11 (which shows an enlarged detail of FIG. 10 from above), the channels 28 that store the side members 3 are positioned in front of the roller 4. This position, as opposed to positioning the channels 28 behind the roller 4, has the advantage of reducing the transition curvature 29 of the side-members 3 as they pass from their extended open V-shape form through the aperture 24 to their closed form, which makes extension and retraction easier.

The screen edge strip 17 has two grooves 18, 19 formed in its underside running along its length. The screen edge strip 17 comprises an underside surface sheet 38 (which may conveniently be formed of a metal), which is attached to the underside of the screen edge strip 17, running along its length, and being positioned between the two grooves 18, 19 such that its edges are approximately flush with the sides of the grooves 18, 19. A series of tabs or projections 37 is formed in the underside surface sheet 38 on each opposed edge and runs along its length. The projections 37 overlap the underside grooves 18, 19. The underside surface sheet 38 may be biased in order to help retract and wind the screen 3 about the rollers 4.

Figure 12:
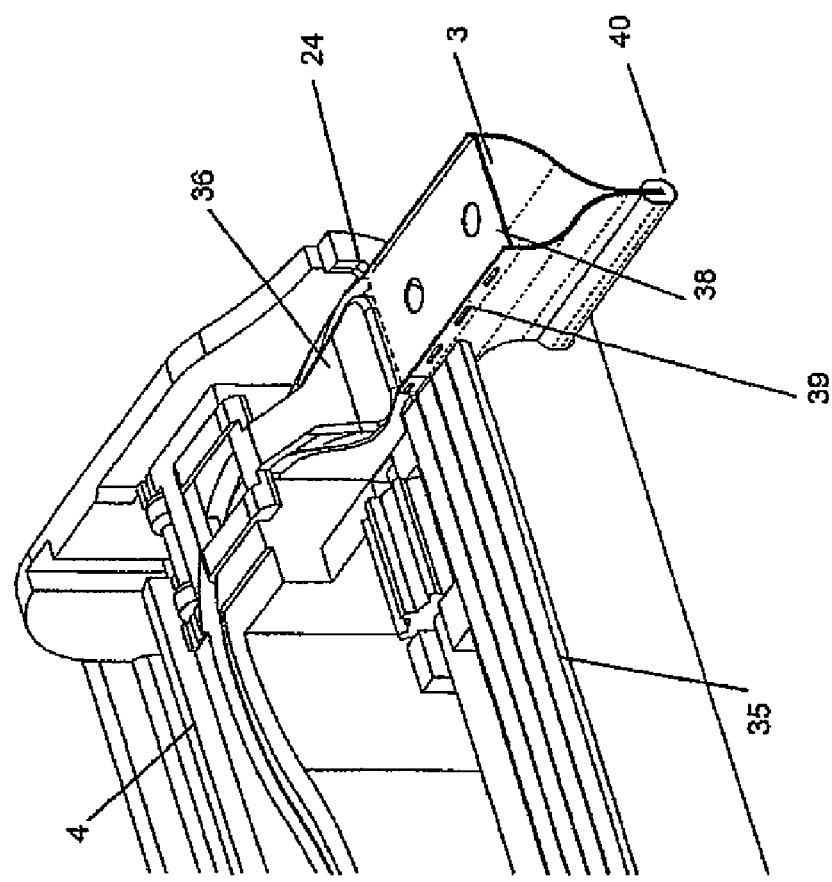
FIG. 12 shows a partially sectioned enlarged detail of FIG. 8 shown in perspective.

Referring to FIG. 12, each side member 3 has an approximately V or Y or "wine glass" cross section shape when in its extended form. The end of each "leg" of the side member 3 has a series of apertures or recesses or perforations 39 running along its length which correspond to the series of projections 37 on the screen edge strip 17. When extended, the ends of the two legs of each side member 3 respectively fit into the two underside grooves 18, 19 such that the projections 37 are received by the perforations 39 in a reversible locking arrangement. When extended, the screen edge strip 17 and the two legs of the side member 3 form a structurally rigid member with a generally triangular cross section shape which provides structural rigidity and protection to the screen 3. When engaged with the screen edge strip 17, the two legs of the side member 3 may have a slight inward bias which helps maintain the engagement of the projections 37 with the perforations 39. The arrangement of the perforations 39 and projections 37 has the advantage of providing a strong stable connection between the side member 3 and the screen edge strip 17, and restricts any relative longitudinal movement between them. The side member 3 locks to the screen edge strip 17 from below only. This arrangement allows the top of the screen 3 to be flat across its width with no structures extending above it. This arrangement also allows a side member 3 with a reduced cross sectional area, which in turn allows a smaller housing 5 to store it.

A guide member in the form of a prong 36 is mounted in the housings 5 between each channel 28 and guide aperture 24. The prong 36 is positioned such that, as the side member 3 retracts into the housing 5, the legs of the side member 3 are drawn past either side of the prong 36. The free end of the prong 36 is sized and shaped so as to slightly force apart the legs of the side member 3 as they pass over the end of the prong 36 such that the perforations 39 in the ends of the legs of the side members 3 disengage with the projections 37 in the grooves 18, 19 of the screen edge strip 17. The screen edge strip 17 passes above the prong 36 and is wound on the roller 4. Further inwards from its free end, the prong 36 curves upwards such that, once disengaged from the side member 3, the screen edge strip 17 is lifted as it passes over the prong 36 such that the screen edge strip 17 is no longer positioned between the legs of the side member 3. The side member 3 is now unobstructed by the screen edge strip 17 so that it can make the transition to a substantially planar form so that it can be stored in the channel 28.

The prong 36 performs similarly in reverse to engage the perforations 39 and projections 37 when the screen 5 is being extended.

Figure 13:
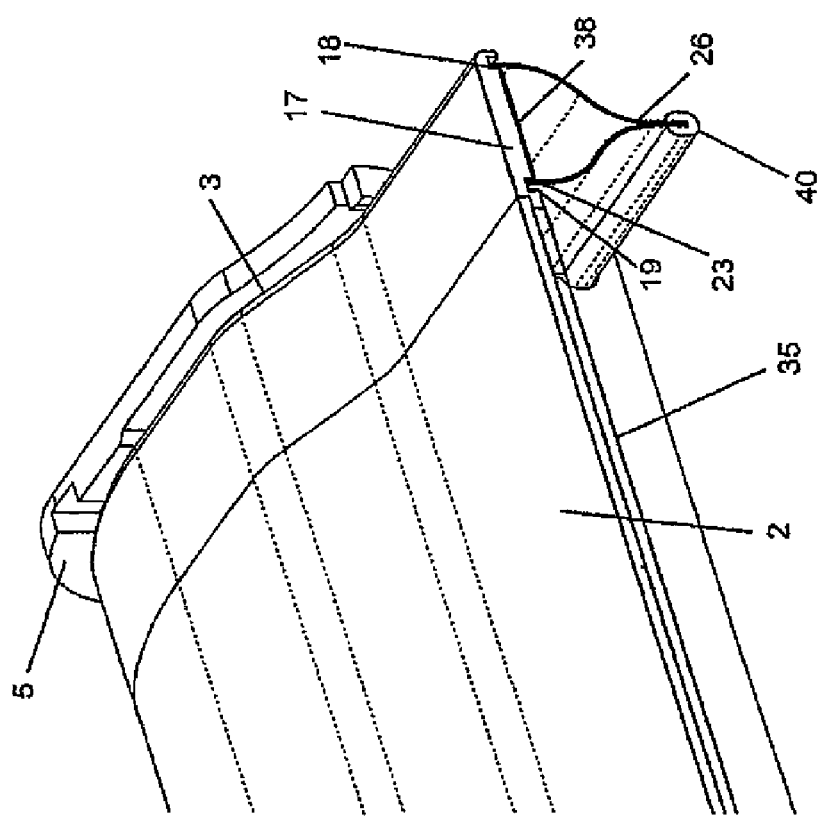
FIG. 13 shows a cross-section of one of the side members of FIG. 8 interlocking with a side of the screen; and, FIG. 14 shows a partial cross-section of the display device of FIG. 8 taken through the cross-bar.
Figure 14:
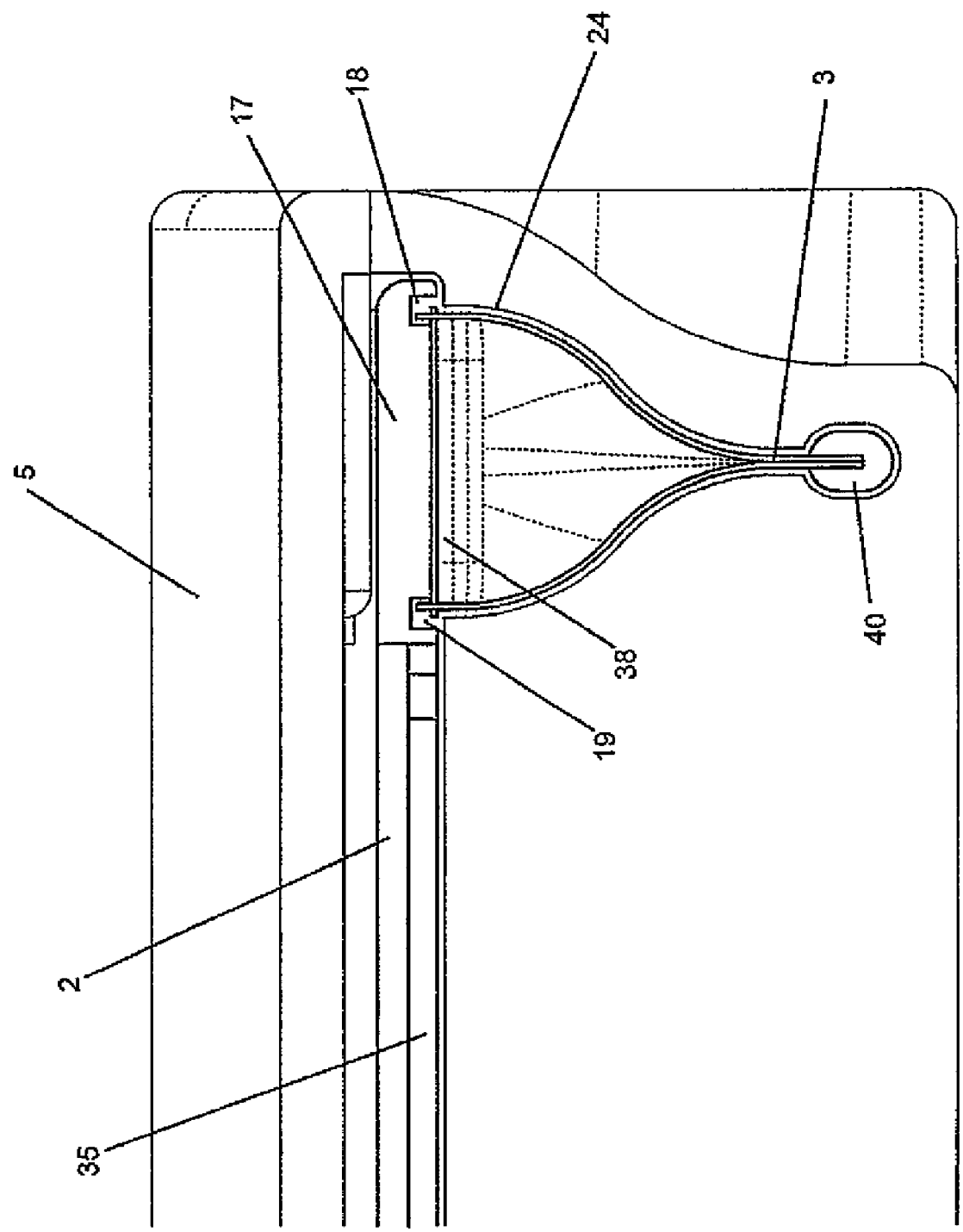

FIGS. 12, 13 and 14 most clearly show (in cross-section) the side member passing through the aperture 24. The side member 3 is preferably arranged with a cross section shape like a wine glass. It is not preferred to form the side member 3 from a bistable material in this example. It is preferred that the side member 3 is formed with a stable form that is intermediate between the open profile of its extended form (shown in FIGS. 12, 13, and 14) and a substantially planar profile. When the side member 3 is extended, the grooves 18, 19 in the underside of the screen edge strip 17 hold the side member 3 in its extended form. When the side member 3 is retracted, the channel 28 holds the side member 3 in its substantially planar form.

The prong 36 may be provided with wheels or rollers, or a layer or coating of a low friction material, such as PTFE, at its free end. This reduces the friction between the end of the prong 36 and the legs of the side member 3 and/or screen edge strip 17 as they slide over the prong 36.

As can be seen most clearly in FIG. 14, the side member 3 has a flexible edge 40 at its base to provide a smooth edge. The flexible screen edge strip 17 has a shaped inward edge to support the screen backing slats 35 forming the screen back 32.

Embodiments of the present invention have been described with particular reference to the examples illustrated. However, it will be appreciated that variations and modifications may be made to the examples described within the scope of the present invention.

What we claim is:

1. A display device, the display device comprising: an extendible screen that is extendible in an extension direction from a relatively compact form to an extended form, the screen having a backing layer that has increased rigidity when planar to provide increased rigidity to the screen when the screen is in its extended form, wherein the backing layer is formed from a smart material.

2. A display device according to claim 1, wherein the smart material is capable of undergoing a current-assisted solid-state phase transition.

3. A display device according to claim 1, wherein the smart material is a shape memory alloy.

4. A display device according to claim 3, wherein the smart material is capable of undergoing a current-assisted solid-state phase transition.

5. A display device according to claim 1, wherein the screen is arranged to roll from the extended form to the relatively compact form.

6. A display device according to claim 5, wherein the rolling screen rolls about a single axis.

7. A display device according to claim 5, wherein the rolling screen rolls partly about a first axis and partly about a second parallel axis.

8. A display device according to claim 1, comprising at least one housing which at least partially accommodates the screen when in said relatively compact form.

9. A display device comprising:
an extendible screen that is extendible in an extension direction from a relatively compact form to an extended form, the screen having a backing layer that has increased rigidity when planar to provide increased rigidity to the screen when the screen is in its extended form,
wherein the backing layer comprises a plurality of slats which extend across the screen in a direction perpendicular to the extension direction and such that the screen can be rolled about at least one axis parallel to the direction of the slats.

10. A display device according to claim 9, wherein the backing layer is formed from a bistable material.

11. A display device according to claim 9, wherein the screen is arranged to roll from the extended form to the relatively compact form.

12. A display device according to claim 11, wherein the rolling screen rolls about a single axis.

13. A display device according to claim 11, wherein the rolling screen rolls partly about a first axis and partly about a second parallel axis.

14. A display device according to claim 9, comprising at least one housing which at least partially accommodates the screen when in said relatively compact form.

* * * * *